(No Model.)
A. A. LYDECKER.
CAR FENDER.
No. 570,645.  Patented Nov. 3, 1896.
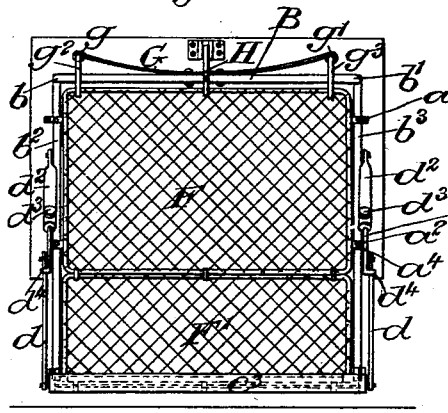
Witnesses:-
George Barry,
V. B. Smith
Inventor:-
Albert A. Lydecker.
by attorneys
Brown & Seward

UNITED STATES PATENT OFFICE

ALBERT A. LYDECKER, OF PATERSON, NEW JERSEY.

CAR-FENDER.

SPECIFICATION forming part of Letters Patent No. 570,645, dated November 3, 1896.

Application filed December 26, 1895. Serial No. 573,281. (No model.)

*To all whom it may concern:*

Be it known that I, ALBERT A. LYDECKER, of Paterson, in the county of Passaic and State of New Jersey, have invented a new and useful Improvement in Car-Fenders, of which the following is a specification.

My invention relates to an improvement in car-fenders, the object being to provide a fender which will be very simple in construction, which can be adjusted bodily toward and away from the track, and one in which the outer end of the fender may be independently adjusted when the fender is in its lowered or operative position.

A further object is to provide a fender of the above class which can be folded up into a very compact space against the front of the dashboard and held securely in such position when not desired for use. In the present invention I contemplate using two fenders, one attached to each end of the car.

A still further object is to provide a fender which will scoop up persons or obstacles from in front of the moving car and will retain said persons or obstacles upon the fender after they have been scooped up thereby.

A practical embodiment of my invention is represented in the accompanying drawings, in which—

Figure 1 is a front view of the fender when in its lowered position, the dashboard of a car being also shown in said view. Fig. 2 is a side view of the same. Fig. 3 is a side view of the fender, the parts being shown in the positions which they assume when the obstruction is being carried by the fender. Fig. 4 is a vertical central section from front to rear, showing the parts in the position which they assume when the fender is folded, as when in use; and Fig. 5 is a detail view of a portion of the fender, showing another form of spring for supporting the upper end of the fender-net.

The platform of the car is denoted by A, and one of its dashboards is denoted by $a$.

Proceeding to describe the fender, B designates the upper bar of the fender-net-supporting frame, which bar extends transversely across the front of the dashboard $a$ short distance therefrom. The said bar B is provided with rearwardly-extended portions $b\ b'$, which extend into close proximity with the front of the dashboard $a$. The bar is then bent to form two vertically-extending portions $b^2\ b^3$, which portions extend downwardly below the bottom of the dashboard and are then bent to form downwardly-extended branches $b^4\ b^5$. The vertically-extended portions of the bar B are adjustably secured to the front of the dashboard $a$ in suitable socket-pieces $a'\ a^2$, which are provided with clamping-nuts $a^3\ a^4$, respectively, which clamping-nuts are adapted to secure the said vertically-extending portions of the bar B rigidly in position when properly adjusted.

Pivoted to the outwardly-extended branches $b^4\ b^5$ of the net-supporting bar B are the ends of rearwardly-extended rods or arms $c\ c'$ of a U-shaped frame C. A suitable cross-bar $c^2$ extends between the pivoted ends of the U-shaped buffer-frame C for strengthening the said frame. The front of the frame C is preferably enlarged, as shown at $c^3$, to form a suitable buffer.

The frame C is supported by a pair of diagonal-jointed braces D D', each consisting of two sections $d\ d'$, pivoted together at their adjacent ends, and pivoted, the one to the frame C at its other end and the other to the vertically-extended portion of the net-supporting frame.

The braces D D' may be lengthened or shortened to raise and lower the forward end of the U-shaped buffer-frame C by means of suitable socket-pieces $d^2$ and clamping-screws $d^3$, which adjusting arrangement is shown in the accompanying drawings as located on the sections $d'$ of the jointed braces D D'. The braces D D' fold upwardly and are prevented from folding downwardly by means of suitable stops $d^4$ upon the upper sections $d'$, which stops engage the lower sections $d$ of the said braces.

The tilting plate E is pivoted near the front of the buffer-frame C in such position that the front edge of the said plate normally rests upon the front of the said frame C.

The fender-net consists of upper and lower sections F F', jointed together along their adjacent edges. The lower edge of the net-section F' is hinged to the rear edge of the tilting plate E, as shown at $f$. The upper section F of the net is supported by the bar B of the net-supporting frame in the following manner: A spring G is secured at its middle portion to the bar B, and its upper ends $g$ $g'$ are normally spaced a short distance away from the said bar B. Loops $g^2$ $g^3$ connect the outer ends $g$ $g'$ of the spring G with the upper edge of the net portion F. When an obstacle is engaged by the net, it will yield downwardly, thereby depressing the ends of the spring G. When the obstacle is removed, the said springs will spring back, thereby returning the net to its original positions.

In the modified form shown in Fig. 5 I have yieldingly supported the upper end of the net by means of suitable coil-springs $G'$, which surround bolts $G^2$, extending through the bar B and the upper edge of the net, the said springs being located between the edge of the net and suitable abutments $G^3$ upon the lower ends of the bolts $G^2$.

A suitable hook H is pivoted to the dashboard $a$ in position to engage the front of the U-shaped frame C when the parts are in their folded position.

When the fender is not in use, it may be folded up into small compass by swinging the U-shaped frame C upon its pivot, thereby allowing the supporting-braces D D' and the net-sections F F' to fold together between the U-shaped buffer-frame C upon its pivot, thereby allowing the supporting-braces D D' and the net-sections F F' to fold together between the buffer-frame C and the front of the dashboard. The hook H may then be engaged with the free end of the buffer-frame C, when the parts will be securely locked in their folded position.

In operation supposing that the fender has scooped up a person or obstacle, the weight of the person or obstacle will depress the net, thereby tilting the plate E and preventing the person or obstacle from being thrown back again onto the track.

In Fig. 3 the parts are shown in the position which they assume when the person or obstacle is held by said fender-net. The outer end of the buffer-frame C is preferably extended upwardly a short distance, so as to form a guard for the outer edge of the tilting plate E, so that a person or obstacle may slide easily over into the net. The net, because of its yielding support at its top, will strike the person or obstacle with a cushioning blow, thereby materially reducing the danger of being struck by said fender.

In the fender as above described it will be seen that it can be adjusted bodily toward and away from the track, and, furthermore, the outer end of the buffer-frame C may be still further adjusted, as may be desired.

It is evident that slight changes might be resorted to in the form and arrangement of the several parts without departing from the spirit and scope of my invention. Hence I do not wish to limit myself strictly to the structure herein set forth, but

What I claim is—

A fender comprising a net-supporting frame, a forwardly-extended buffer-frame pivoted at its rear to the net-supporting frame, a tilting plate pivoted near the front of the buffer-frame in such position that the front end of the plate normally rests upon the front of said frame and a net secured at its bottom to the rear edge of the tilting plate and at its top connected to spring-supports attached to the net-supporting frame, substantially as set forth.

ALBERT A. LYDECKER.

Witnesses:
FREDK. HAYNES,
IRENE B. DECKER.